United States Patent
Jensen et al.

(10) Patent No.: US 6,480,967 B1
(45) Date of Patent: Nov. 12, 2002

(54) MULTIPLE MODULE PROCESSING SYSTEM WITH RESET SYSTEM INDEPENDENT OF RESET CHARACTERISTICS OF THE MODULES

(75) Inventors: Rune Hartung Jensen; Michael Gartlan, both of Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/316,783

(22) Filed: May 21, 1999

(51) Int. Cl.[7] .................................................. G06F 1/04
(52) U.S. Cl. ........................ 713/600; 713/400; 713/500; 710/8; 710/104; 712/15
(58) Field of Search ................................. 713/400, 401, 713/500, 501–503, 600, 1, 100, 601; 710/20, 25, 8, 104, 10; 709/220; 712/15, 10; 714/23

(56) References Cited

U.S. PATENT DOCUMENTS

| | | | |
|---|---|---|---|
| 4,586,179 A | * 4/1986 | Sirazi et al. | 371/12 |
| 4,967,377 A | 10/1990 | Masuda | 364/518 |
| 5,398,233 A | * 3/1995 | Balmer et al. | 370/13 |
| 5,648,959 A | * 7/1997 | Ilyadis et al. | 370/445 |
| 5,703,498 A | * 12/1997 | Gould et al. | 326/40 |
| 5,734,877 A | * 3/1998 | Ries et al. | 713/500 |
| 6,021,500 A | * 2/2000 | Wang et al. | 713/320 |
| 6,038,661 A | * 3/2000 | Yoshioka et al. | 712/244 |
| 6,076,177 A | * 6/2000 | Fontenot et al. | 714/724 |
| 6,219,217 B1 | * 4/2001 | Obermaier et al. | 361/115 |

FOREIGN PATENT DOCUMENTS

| WO | WO8805569 | 1/1987 | G06F/1/00 |
|---|---|---|---|

OTHER PUBLICATIONS

IBM Technical Disclosure Bulletin, Multiple Card Interlocking—Power on Reset Control Circuit, vol. 36, No. 12, Dec. 1993.

IBM Technical Disclosure Bulletin, "Power–on–Reset Circuit Sensitive to Power Supply Level and Clock", vol. 37, No.02A, Feb. 1994.

* cited by examiner

Primary Examiner—Jeffrey Gaffin
Assistant Examiner—Rijue Mai
(74) Attorney, Agent, or Firm—Steven R. Biren

(57) ABSTRACT

A reset module operates in conjunction with a system clock module to provide a combination of reset and clock assertions that can be relied upon to reset conventional processing modules having a variety of reset architectures. A reset command initiates an assertion of the reset signal and an activation of all clocks at the system level. After a predetermined number of clock cycles, the system level clocks are deactivated, and then the reset signal is de-asserted. By providing multiple clock cycles with the reset signal asserted, processing modules having either asynchronous and synchronous reset will be reset. By disabling the clocks before de-asserting the reset signal, the likelihood of a timing hazard caused by an interaction of the reset signal and a clocking signal is reduced or eliminated.

17 Claims, 3 Drawing Sheets

MULTIPLE MODULE PROCESSING SYSTEM WITH RESET SYSTEM INDEPENDENT OF RESET CHARACTERISTICS OF THE MODULES

BACKGROUND OF THE INVENTION

1. Field of the Invention

This invention relates to the field of electronic systems, and in particular to systems comprising components having potentially different reset strategies.

2. Description of Related Art

To contain and potentially shorten the design and development cycle time for large scale systems, previously designed components, or modules, are commonly used. Such modules, having been designed for systems having differing requirements, often have differing clock and timing constraints. Some modules, for example, may employ a positive-edge-triggered clocking scheme, others may employ a negative-edge-triggered clocking scheme, while others may be level sensitive, multi-phased, and so on. In like manner, the convention used for resetting each module may differ. Asynchronous or synchronous reset strategies may be employed, and often a combination of both is common. For each module, the reset strategy employed introduces timing constraints relative to the particular clocking scheme employed. Examples of such timing constraints include: a synchronous reset must arrive at the module a specified duration before the active edge of the clock and/or be held at its active state for a specified duration after the clock edge; an asynchronous reset should not be released in close proximity to a change of clock state in a level sensitive clocking design; a reset signal should not be asserted, or de-asserted, in close proximity to an assertion or desertion of a set signal; and so on. From a systems viewpoint, the varying reset and clocking strategies produce a combinatorially complex set of design constraints.

To accommodate the varying clocking strategies among modules, conventional systems include a module-clock-generator that generates the various clocking signals, at appropriate frequency and phase relative to each other for proper system operation. Accommodation of the varying reset strategies is commonly somewhat less structured. Typically, because of the combinatorial nature of the problem, specific reset circuitry is designed for each module, or for each set of modules having a similar combination of reset and clock configurations. While the design of each reset circuit may not be unduly burdensome, the system level design task of properly defining, configuring, and testing each of these circuits can be significant.

The testing task for reset circuits is particularly burdensome because of the difficulties associated with timing related anomalies. In a well structured system design, the system designer strives to use synchronous functions and operations to minimize timing related problems. Because of the lack of standardization for reset strategies, and the variety of alternatives available, including asynchronous operation, the likelihood of a timing related error is high, and the cost of isolating and preventing the particular circumstances that produce the problematic timing sequences is high.

The use of specific, time-dependent, reset circuits also minimizes the likelihood that systems designed with such circuits will "scale" as technologies change, or as other features are added to the system. Similarly, the use of such a system as a future module in a larger system will only serve to exacerbate the problems associated with modules having differing reset strategies and timing constraints.

BRIEF SUMMARY OF THE INVENTION

It is an object of this invention to provide a reset architecture that provides for a reliable and robust system reset capability that is independent of the reset configurations used in the modules that comprise the system. It is another object of this invention to provide a reset architecture that is modular. It is another object of this invention to provide a reset architecture that is scalable. It is another object of this invention to provide a reset architecture that is easy to test. It is another object of this invention to provide a reset architecture that reduces the complexity associated with system tests.

These objects, and others, are achieved by providing a reset module that operates in conjunction with the system clock module to provide a combination of reset and clock assertions that can be relied upon to reset conventional processing modules having a variety of reset architectures. In a preferred embodiment, a reset command initiates an assertion of the reset signal and an activation of all clocks at the system level. After a predetermined number of clock cycles, the system level clocks are deactivated, and then the reset signal is de-asserted. By providing multiple clock cycles with the reset signal asserted, processing modules having either asynchronous and synchronous reset will be reset. By disabling the clocks before de-asserting the reset signal, the likelihood of a timing hazard caused by an interaction of the reset signal and a clocking signal is reduced or eliminated.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
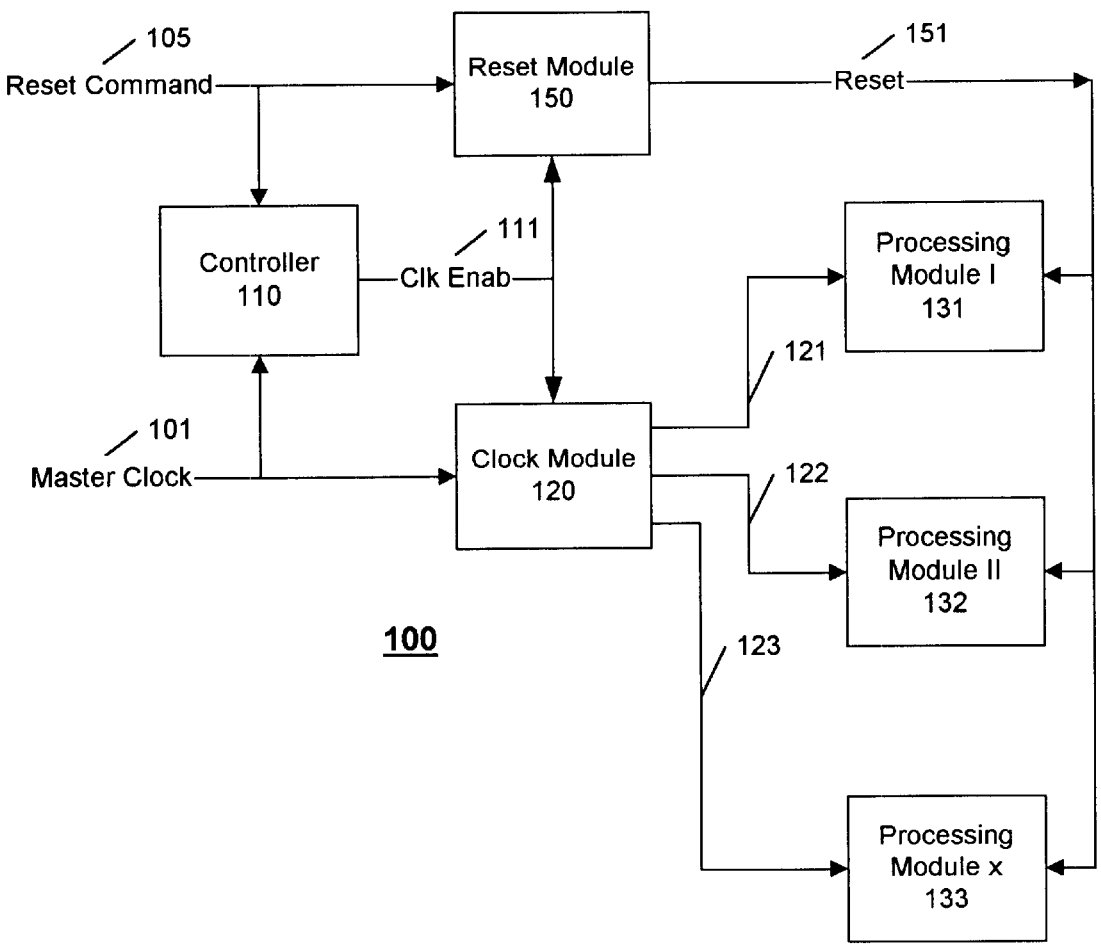
FIG. 1 illustrates an example block diagram of a processing system having a reset module in accordance with this invention.

FIG. 1 illustrates an example block diagram of a processing system 100 having a reset module 150 in accordance with this invention. In addition to the reset module 150, the processing system 100 comprises a controller 110, a clock module 120, and one or more processing modules 131–133.

The processing modules 131–133 are used herein as paradigms for devices that perform some function in dependence upon a clocking signal 121–123, respectively, and which are responsive to a reset signal 151 that place the module into a known, or knowable, initial state. The processing device, for example, may be a state machine that is resettable to a predefined state, or to a state corresponding to an external parameter; it may be a printer controller that initiates a sequence of commands to place the print head of a printer into a known state, at a known physical location; a CD player controller that reads the contents of the currently loaded disk and present a menu for selection by a user; and so on.

The clock module 120 provides the necessary module-clock signals 121–123 for each of the processing modules 131–133. Conventionally, the clock module 120 provides these module-clock signals 121–123 based upon a common master clock signal 101, to facilitate synchronization and other time related operations. In accordance with this invention, the generation of the module-clock signals 121–123 is also dependent upon a clock enable signal 111 that is provided by the controller 110.

The controller 110 operates in conjunction with the reset module 150 and clock module 120 as follows. Upon receipt of a reset command 105, the reset module 150 asserts the reset signal 151, and the controller 110 asserts the clock enable signal 111. Once asserted, the reset module 150 is configured, in accordance with this invention, to keep the reset signal 151 asserted until the clock enable signal 111 is de-asserted, using, for example a set-reset bistable device (SR-flip-flop). The controller 110 is configured, in accordance with this invention, to assert the clock enable signal 111 for a predetermined number of cycles of the master clock 101. This predetermined number of cycles is at least as great as the largest of the minimum number of master clock cycles required to initialize each processing module 131–133. That is, for example, if the minimum number of clock cycles required to initialize modules 131, 132, and 133 is three, zero, and two clock cycles, the controller 110 asserts the clock enable signal 111 for at least three clock cycles. In accordance with a preferred embodiment of this invention, recognizing that the speed of a reset operation is not typically a significant performance parameter, the predetermined number of cycles for asserting the clock enable signal is chosen to be a number that is greater than the minimum requirement. In accordance with another aspect of this invention, the predetermined number of cycles for asserting the clock enable signal is chosen to be a number that is substantially greater than an expected minimum requirement, thereby allowing for a large margin for the addition of other, as yet unknown, processing module, or allowing for the use of the controller 110 and reset module 150 for other processing systems. In a common embodiment of this invention, the predetermined number of cycles for asserting the clock enable signal 111 is chosen to be 256.

The controller 110 de-asserts the clock enable signal 111 after the predetermined number of master clock 101 cycles. As noted above, the reset module 150 is configured to de-assert the reset signal 151 after receiving this de-assertion of the clock enable signal 111. In a preferred embodiment of this invention, the reset signal 151 is de-asserted after a minimum time duration from the de-assertion of the clock enable signal 111, to allow for reset hold time durations, if any, of the processing modules 131–133.

Figure 2:
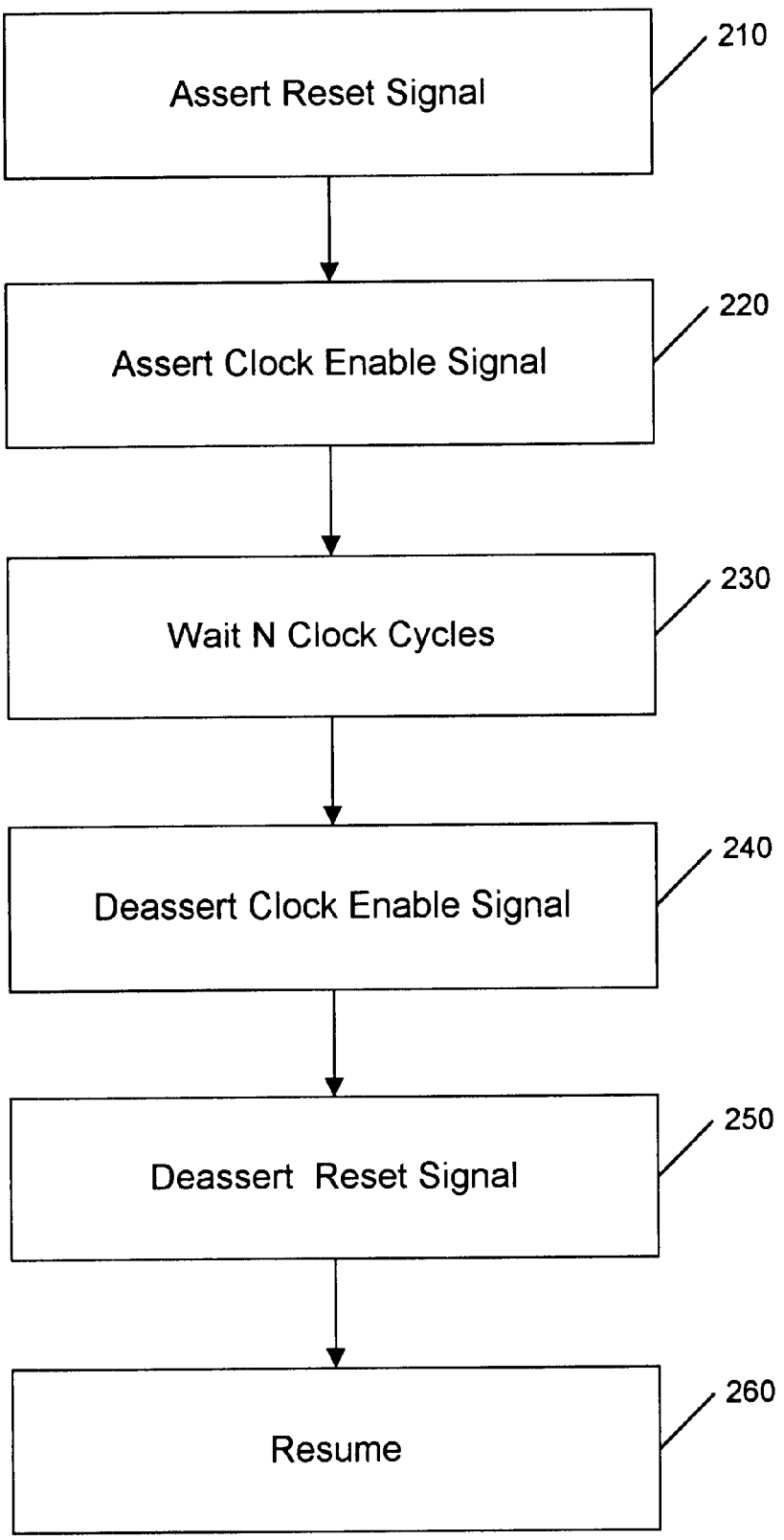
FIG. 2 illustrates an example flow diagram of a controller and reset module for a processing system in accordance with this invention.

FIG. 2 illustrates an example flow diagram for a processing system having a reset module in accordance with this invention. This flow diagram is effected upon receipt of a reset command, which may be explicit or implicit; an explicit reset is, for example, a reset that is initiated by a user, while an implicit reset is, for example, one that is initiated when power is first applied to the system. In response to the reset command, the reset signal is asserted and communicated to each of the processing modules, at 210. This signal remains asserted until explicitly de-asserted, at 250. At 220, the clock-enable signal is asserted and communicated to the clock module, in response to which the clock module provides the individual clock signals to each processing module. At 230, the controller waits for a predetermined number of clock cycles, as discussed above. Thereafter, the clock-enable signal is de-asserted, at 240, in response to which the clock module ceases the individual clock signals to each processing module. After the clocks are ceased, the reset signal is de-asserted, at 250, and the normal system operations are resumed, at 260.

Figure 3:
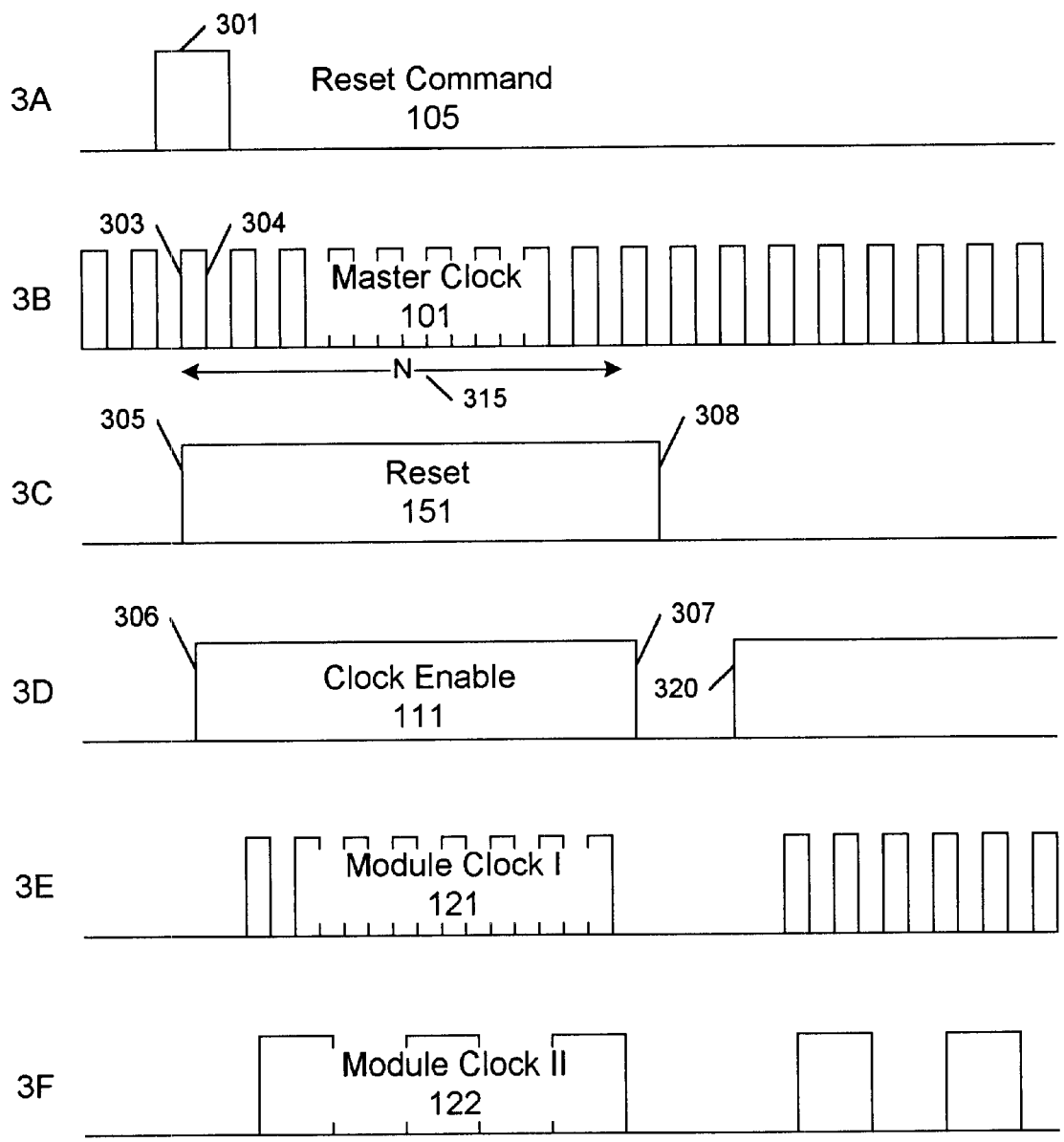
FIG. 3 illustrates an example timing diagram of a processing system in accordance with this invention.

FIG. 3 illustrates an example timing diagram of a processing system in accordance with this invention, using the same reference numerals as the corresponding signals in FIG. 1. Line 3A illustrates an example reset command 105, which as mentioned above, may be explicit or implicitly generated. Line 3B illustrates an example master clock signal 101, which is typically generated by a free running crystal oscillator or other source using techniques common in the art. In accordance with this invention, in response to the asserted reset command at 301, the reset signal 151 is asserted, at 305. In the example timing diagram of FIG. 3, the assertion 305 of the reset signal 151 is synchronous with the master clock 101, but the assertion 305 may occur asynchronously as well. Also in response to the assertion of the reset command at 301, the clock-enable signal 111 is asserted, at 306. Because the clock-enable signal 111 is related to clock generation based on the master clock 101, the clock-enable signal 111 in a preferred embodiment is synchronous with the master clock 101. Following conventional hazard-avoidance design practice, the clock-enable signal 111 preferably occurs during an inactive period of the master clock 101. Illustrated at 3D, the clock-enable signal 111 occurs a short time duration after a rising edge 303 of the master clock 101 and before the next falling edge 304. Thereafter, the clock module 120 of FIG. 1 generates the appropriate module-clock signals 121, 122, and any others. The particular frequency and phase of each module-clock signal is determined by the requirements of the individual processing modules in the system and the overall system timing constraints, using common system design techniques.

After N 315 cycles of the master clock 101, the clock-enable signal 111 is de-asserted, terminating the generation of module-clock signals 121, 122, and any others. As above, the de-assertion 307 of the clock-enable signal 111 is preferably synchronous with the master clock 101 and occurs during an inactive period of the master clock 101. In response to the de-assertion 307 of the clock-enable signal 111, the reset signal 151 is de-asserted, at 308. As noted above, the de-assertion of the reset signal 151 in a preferred embodiment occurs after some minimum time duration after the de-assertion of the clock-enable signal 111, to avoid any potential hazards caused by a race between the clock-enable signal 111, the reset signal 151, and the master clock 101.

Illustrated in FIG. 3, at 320, the clock-enable signal 111 is re-asserted some time after the reset signal 151 is de-asserted, thereby allowing the system 100 of FIG. 1 to resume normal operation after the above described reset process. In a preferred embodiment, the time duration between the de-assertion 308 of the reset signal 151 and the resumption 320 of normal operations is at least one cycle of the master clock 101, but can be more, depending upon an anticipated delay time required for the processing modules 131–133 to properly complete their reset processes.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the signals of FIG. 3 are illustrated as being active-high. Some systems 100 or modules 131–133 may employ active-low signaling; the addition of inverters to effect the appropriate operations within each system or module would be evident to one of ordinary skill in the art. In an alternative embodiment, for example, the reset module 150 may be configured to provide both an active high and an active low reset signal 151, and the appropriately phased reset signal provided to each processing module 131–133. The particular configurations and structures are provided in FIG. 1 for illustration only. Alternative configurations, such as the incorporation of the clock module 120 within the controller 110, would be evident to one of ordinary skill in the art. The functional blocks may be implemented in hardware, software, or a combination of both. For example, the functions of the controller 110 may be embodied in programming code that is executed in an embedded processor, or programming code that effects the creation of a programmed logic array that operates as a state machine to effect the required functions. These and other system implementation and optimization techniques will be evident to one of ordinary skill in the art in view of this invention, and within the intended scope of the following claims.

We claim:

1. A processing system comprising:
    at least one processing module that is responsive to a module-clock signal and to a reset signal, wherein the processing module is initialized to an initial state in response to an assertion of the reset signal, and performs a processing function in dependence upon a de-assertion of the reset signal,
    a clock module that provides the module-clock signal in dependence upon a master-clock signal and an assertion of a clock-enable signal,
    a controller that provides the assertion of the clock-enable signal in dependence upon a reset command, and
    a reset module that provides the assertion of the reset signal in response to the reset command and provides the de-assertion of the reset signal in response to a de-assertion of the clock-enable signal,
    wherein
        the controller provides the de-assertion of the clock-enable signal after a number of cycles of the master-clock signal.

2. The processing system of claim 1, wherein
    the number of cycles of the master-clock signal is dependent upon a time required to effect the initial state of the at least one processing module.

3. The processing system of claim 1, wherein
    the number of cycles of the master-clock signal is a predetermined number that is substantially larger than an expected number of cycles of the master-clock signal to effect the initial state of the at least one processing module.

4. The processing system of claim 1, wherein
    the de-assertion of the reset signal occurs a time duration after the de-assertion of the clock-enable signal that is greater than a hold time duration associated with the at least one processing module.

5. A method of resetting a plurality of processing modules, the method comprising:
    asserting a reset signal in response to a reset command,
    enabling one or more clocks used by the plurality of processing modules for a predetermined number of cycles of a master clock, and
    thereafter
        disabling the one or more clocks, and
        de-asserting the reset signal.

6. The method of claim 5, wherein the predetermined number of cycles of the master clock is dependent upon a reset characteristic of at least one of the plurality of processing modules.

7. The method of claim 5, wherein the predetermined number of cycles of the master clock is independent of a reset characteristic of the plurality of processing modules.

8. A processing system comprising:
    first and second processing modules having different reset characteristics, each of said first and second processing modules being controlled by a respective module-clock signal and by a reset signal, wherein each processing module is initialized to an initial state in response to the reset signal and performs its processing function upon deactivation of the reset signal,
    a clock module that provides respective first and second module-clock signals to the first and second processing modules in response to a master-clock signal and to a clock-enable signal,
    a controller that provides the clock-enable signal in response to a reset command,
    a reset module that provides the reset signal to the first and second processing modules in response to said reset command and deactivates the reset signal in response to a deactivation of the clock-enable signal by the controller, wherein
        the controller deactivates the clock-enable signal after a number of cycles of the master-clock signal.

9. The processing system as claimed in claim 8 wherein the first processing module requires a greater minimum number of master-clock signal cycles to initialize it than does the second processing module, and said number of cycles of the master-clock signal for deactivation of the clock-enable signal by the controller is determined by the minimum number of master-clock signal cycles required to initialize the first processing module.

10. The processing system as claimed in claim 8 wherein the reset module deactivates the reset signal a given time delay after deactivation of the clock-enable signal by the controller.

11. The processing system as claimed in claim 10 wherein said given time delay is determined by the greater of the hold time durations of the first and second processing modules.

12. The processing system as claimed in claim 8 wherein the reset module provides a common reset signal to the first and second processing modules.

13. The processing system as claimed in claim 8 wherein the first module-clock signal is not identical to the second module-clock signal.

14. The processing system as claimed in claim 8 wherein said number of cycles of the master-clock signal is chosen such that the reset procedure of the processing system is independent of the individual reset characteristics of the first and second processing modules.

15. The processing system as claimed in claim 8 wherein the controller is further responsive to the master-clock signal.

16. The processing system as claimed in claim 8 wherein the reset module is controlled by the reset command and the clock-enable signal, the controller is controlled by the reset command and the master-clock signal, the clock module is controlled by the clock-enable signal and the master-clock signal, and the first and second processing modules are controlled by the reset signal and the first and second module-clock signals, respectively.

17. The processing system as claimed in claim 8 wherein said number of cycles of the master-clock signal is chosen so as to accommodate the reset characteristics of possible future processing modules to be added to the processing system.

* * * * *